US009176640B1

(12) United States Patent
Behboodian

(10) Patent No.: US 9,176,640 B1
(45) Date of Patent: *Nov. 3, 2015

(54) METHOD OF GRAPHICALLY LINKING MULTIPLE DISJOINT MODELS

(71) Applicant: The MathWorks, Inc., Natick, MA (US)

(72) Inventor: Ali Behboodian, Eden Prairie, MN (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,252

(22) Filed: May 29, 2014

Related U.S. Application Data

(63) Continuation of application No. 11/646,873, filed on Dec. 27, 2006, now Pat. No. 8,751,199.

(51) Int. Cl.
| | |
|---|---|
| *G06F 7/60* | (2006.01) |
| *G06F 17/10* | (2006.01) |
| *G06F 9/455* | (2006.01) |
| *G06F 17/00* | (2006.01) |
| *G06F 3/048* | (2013.01) |
| *G06F 9/44* | (2006.01) |
| *G06F 3/0481* | (2013.01) |
| *G06F 17/30* | (2006.01) |
| *G06F 17/50* | (2006.01) |

(52) U.S. Cl.
CPC .............. *G06F 3/0481* (2013.01); *G06F 8/34* (2013.01); *G06F 9/455* (2013.01); *G06F 17/30312* (2013.01); *G06F 17/5009* (2013.01)

(58) Field of Classification Search
CPC ........ G06F 17/5009; G06F 9/455; G06F 8/34
USPC .............. 703/2, 24, 26, 27; 715/201, 826; 717/106
See application file for complete search history.

(56) References Cited

U.S. PATENT DOCUMENTS

| | | | |
|---|---|---|---|
| 5,204,947 | A | 4/1993 | Bernstein et al. |
| 5,644,740 | A | 7/1997 | Kiuchi |
| 5,706,502 | A | 1/1998 | Foley et al. |
| 7,062,718 | B2 | 6/2006 | Kodosky et al. |
| 7,509,244 | B1 | 3/2009 | Shakeri et al. |
| 8,751,199 | B1 * | 6/2014 | Behboodian ............ 703/2 |
| 2005/0050166 | A1 | 3/2005 | Reynolds et al. |
| 2005/0278162 | A1 | 12/2005 | Ciolfi et al. |
| 2005/0289524 | A1 | 12/2005 | McGinnes |

(Continued)

OTHER PUBLICATIONS

Mathworks, NPL, "Simulink, simulation and Model-Based Design", version 6, Sep. 2005.*

(Continued)

*Primary Examiner* — Omar Fernandez Rivas
*Assistant Examiner* — Angel Calle
(74) *Attorney, Agent, or Firm* — Harrity & Harrity, LLP

(57) ABSTRACT

The disclosed methods, mechanisms, and system provide the ability to associate one or more disjointed models such that a second model can be accessed from a first model thereby allowing easier navigation between models. A graphical link to a second model is provided as part of a first model. Activating the graphical link opens the second model for viewing or editing. Links between additional models may also be provided. Thus, by using the provided graphical links, a user may quickly and easily navigate between all the associated models.

20 Claims, 11 Drawing Sheets

(56) References Cited

U.S. PATENT DOCUMENTS

| | | |
|---|---|---|
| 2006/0161862 A1 | 7/2006 | Racovolis et al. |
| 2007/0094076 A1 | 4/2007 | Perkowski et al. |
| 2007/0288885 A1 | 12/2007 | Brunel et al. |
| 2008/0098349 A1* | 4/2008 | Lin et al. .................. 717/106 |
| 2009/0254801 A1 | 10/2009 | Pressman et al. |

OTHER PUBLICATIONS

"Simulink, Simulation and Model-based Design", Simulink ® reference version 6, Mar. 2005.

"Simulink, Simulation and Model-based Design", Using Simulink, Version 6, Sep. 2005.

* cited by examiner

METHOD OF GRAPHICALLY LINKING MULTIPLE DISJOINT MODELS

RELATED APPLICATION

This application is a continuation of U.S. patent application Ser. No. 11/646,873, filed Dec. 27, 2006 (now U.S. Pat. No. 8,751,199), the disclosure of which is incorporated by reference herein in its entirety.

BACKGROUND

Graphical modeling environments are software applications that enable modeling using graphical constructs. In many graphical modeling environments, a graphical user interface is provided which enables a user to construct a model of a system. The user may build a model by interconnecting components provided by the graphical modeling environment. Once a user has completed construction of a model, the user may save the model for future use. Some graphical modeling environments enable simulation, code generation, and/or analysis of models Graphical modeling environments may be used to model systems that may not readily lend themselves to a representation in a single model. For a variety of reasons, many systems are modeled not by a single model but by multiple disjoint models. For example, there may be different implementations of a system depending on the requirements of the system, such as a double precision implementation of a system and a fixed point implementation of a system. In another example, the system being modeled may be large and complicated wherein portions of the overall system are represented by individual models.

SUMMARY

In accordance with a first aspect, a method is provides navigation between models in a graphical modeling environment. The method involves providing a first model representing a system and providing, as part of the first model, a graphical link to a second model which is not part of the first model. Thus when the graphical link is activated, the second model is opened or displayed.

In accordance with another aspect, a computer-readable medium is provided that holds instructions for providing navigation between models in a graphical modeling environment. The medium includes instructions for providing a first model representing a system and instructions for providing, as part of the first model, a graphical link to a second model that is not part of the first model.

In accordance with another aspect, a method is provided for navigation between models in a graphical modeling environment. The method involves providing at least three models representing a system; providing, as part of the first model, a graphical link to at least one of the second model or third model; providing, as part or the second model, a graphical link to at least one of the first model or third model; and providing as part of the third model, a graphical link to at least one of the first model or second model.

In accordance with another aspect, a model linking mechanism is provided for linking two or more models together. The mechanism includes an association mechanism for creating an association between at least a first model and a second model; and a link generator for creating a graphical link, based on the association of at least the first model and the second model.

In accordance with another aspect, a system is provided for generating and displaying a graphical modeling application. The system comprises a distribution server for providing to a client device a first model having a graphical link to a second model and a client device in communication with the distribution server.

In accordance with another aspect, in a network having a server executing a graphical modeling environment and a client device in communication with the server, a method is provided. The method involves providing, at the client, a first model representing a system; providing, as part of the first model, a graphical link to second model at the server; and receiving, at the client device from the server, the second model in response to the activation of the graphical link.

DETAILED DESCRIPTION OF ILLUSTRATIVE EMBODIMENTS

Conventional model viewing may be performed by opening the models in a graphical modeling environment using standard file commands (such as the "open" command from the file command menu provided in most window based applications). This conventional approach may require the user to be aware of which models are related. In addition, the user may need to know the names and/or locations of the models in order to access them. Shortcomings associated with conventional model viewing may be further complicated when there are multiple users working on a project using multiple computers/displays as each user may work on a model and may save the model locally on his/her a computer. When another user desires to view the model, he/she may need to be aware of what computer the model is stored on in order to access the desired model.

Exemplary embodiments described herein enable easy navigation among disjoint models. For example, a user may display a first model on a display device and may then navigate to a second model. The second model may be displayed on the display when the second model is accessed by the user. As used herein disjoint models refer to models that exist independently of each other, i.e., there is no functional dependence, and so, for example, they can execute without access to each other's interface or contents. In an embodiment, the models may be related but to each other. For example, each model may be an independent model file. In one embodiment, a user may associate disjoint models such that a second model can be accessed from a first model. For example, a graphical link to a second model may be provided as part of the first model. Activating the link may open the second model for viewing, editing, simulation, etc. Likewise, a graphical link to the first model may be provided in the second model to navigate to the first model. Links between additional models may also be provided. By using the provided graphical links, a user may quickly and easily navigate between substantially any number of related models, where the related models may reside on the same platform or may be distributed across multiple platforms.

Figure 1A:
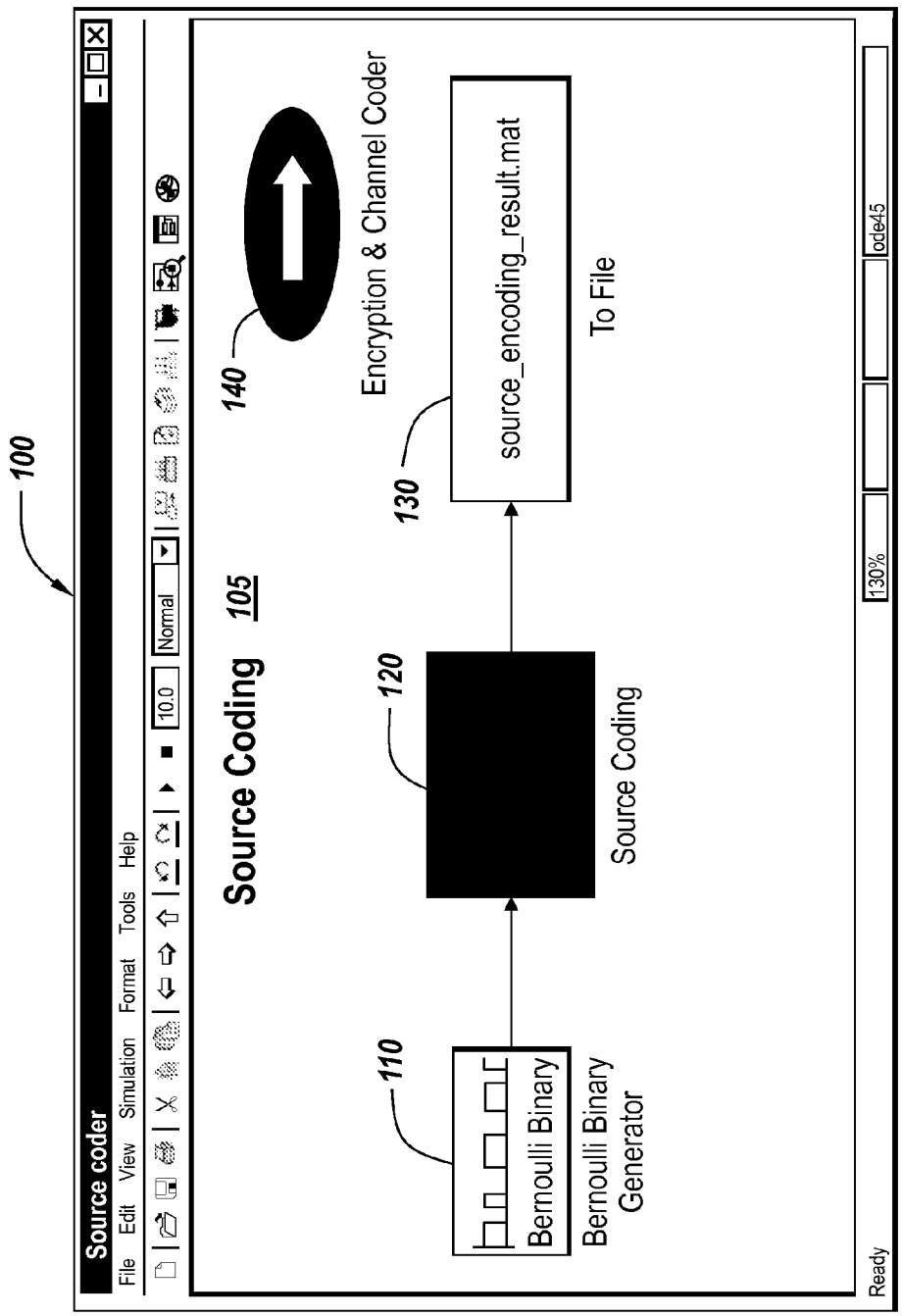
FIG. 1A is an example of a model in a graphical modeling environment.

An example of a model 105 can be seen in FIG. 1A. In this example, a graphical model representation 105 of a Source Encoder of a communication system is displayed in a window 100 of graphical modeling environment. The model 105 of the Source Encoder includes a Bernouli Binary Generator 110. The Bernouli Binary Generator 110 generates a Bernouli binary signal that is fed into Source Coding block 120. The Source Coding block 120 encodes the bernouli binary signal and stores the encoding to a file 130, designated as "source_encoding_result.mat" in FIG. 1A.

The Source Encoder of FIG. 1A is used in conjunction with an Encryption and Channel Encoder. As a user is designing, testing, and debugging the Source Encoder 105 of FIG. 1A it may be useful to be able to view or modify the Encryption and Channel Encoder with which the Source Encoder 105 is used. As such, the model 105 of the Source Encoder in FIG. 1A is provided with a graphical link 140 to the model of the Encryption and Channel Encoder with which it is used.

In the embodiment of FIG. 1A, the graphical link 140 is represented as an activation element, such as a button, that may be activated based on a user input. For example, a user may select graphical link 140 using a pointing device such as a mouse, stylus, trackball, touch sensitive display, etc. Other input devices may also be used to select and activate the button, such as a keyboard, microphone operating with speech processing software, etc. In other embodiments, the graphical link 140 may be a configurable block that can be inserted into the model and configured to link to another model. The link mechanism may be implemented using linking technique known in the relevant arts. Examples of possible linking techniques include, but are not limited to, macros, scripts, hyperlinks, etc. In some embodiments, activating the link opens the linked model in the current window 100. In other embodiments, the new model is opened in a new window (not shown in FIG. 1A).

Figure 1B:
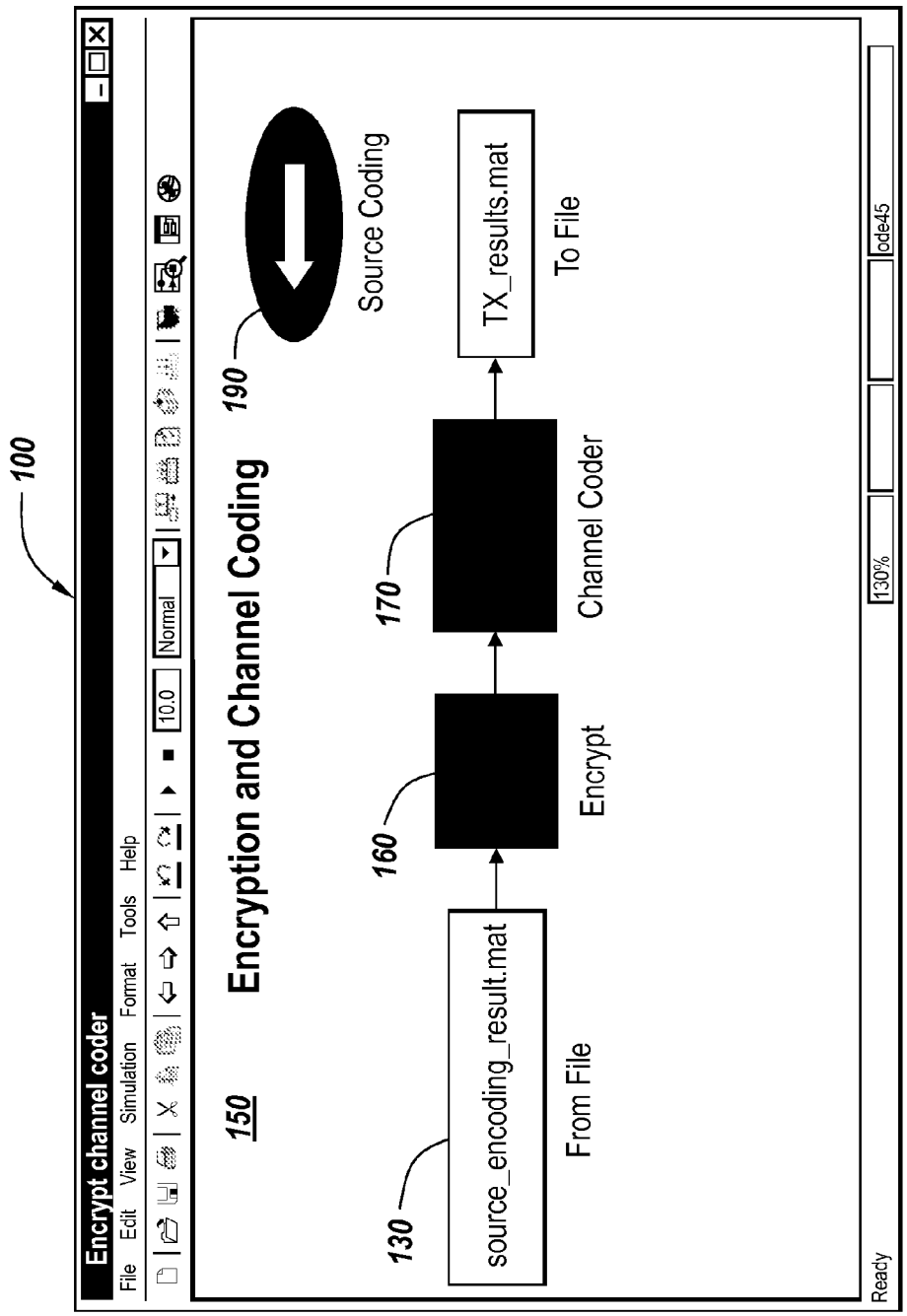
FIG. 1B is an example of a model that is graphically linked to the model of FIG. 1A.

When the graphical link 140 of the first model 105 of a Source Encoder is activated, the associated second model of an Encryption and Channel Encoder is opened, allowing the user to view and/or edit the model. An example of a second model 150 is shown in FIG. 1B. Model 150 may be graphically linked to the model 105 via graphical link 140. In the embodiment of FIG. 1B, a graphical model representation 150 of an Encryption and Channel Encoder of communication system is displayed in the window 100. Model 150 may include an input, here file 130 which was written to by the Source Coding block 120 of FIG. 1A. Model 150 may use file 130 to provide input data to Encryption block 160. The Encryption block 160 may in turn be connected to Channel Coder block 170. Channel Coder block 170 may generate an output that is sent to a destination, such as file 180.

In certain embodiments, the second model 150 may include a graphical link to the first model 105. For example, model 150 may include a graphical link 190, where activating graphical link 190 returns the user to model 105. In one implementation, model 105 may replace model 150 in window 100. Alternately, model 105 may be opened in a separate window to allow the user to view model 105 and model 150 simultaneously.

Graphical links 140 and 190 allow the user to easily navigate back and forth between the associated models 105, 150. Thus, when a change is made to one model that would affect the other model, the necessary changes can easily and quickly be made to the other model using the provided graphical link to access the associated model. For example, a user may manually carry a change from model 105 to model 150 by performing, for example, a copy and paste operation. In another implementation, logic operation with model 105 and model 150 may sense a change to model 105 and may automatically update, replace, add, etc., content to model 150 as needed.

While the previous examples focused on two associated models that were respective parts of a lager system, it should be understood that associations and the use of graphical links is not limited to such implementations. Indeed, models representing different implementations of the same system may be associated and graphically linked together. An example of such an implementation can be seen in FIGS. 2A-2D.

Figure 2A:
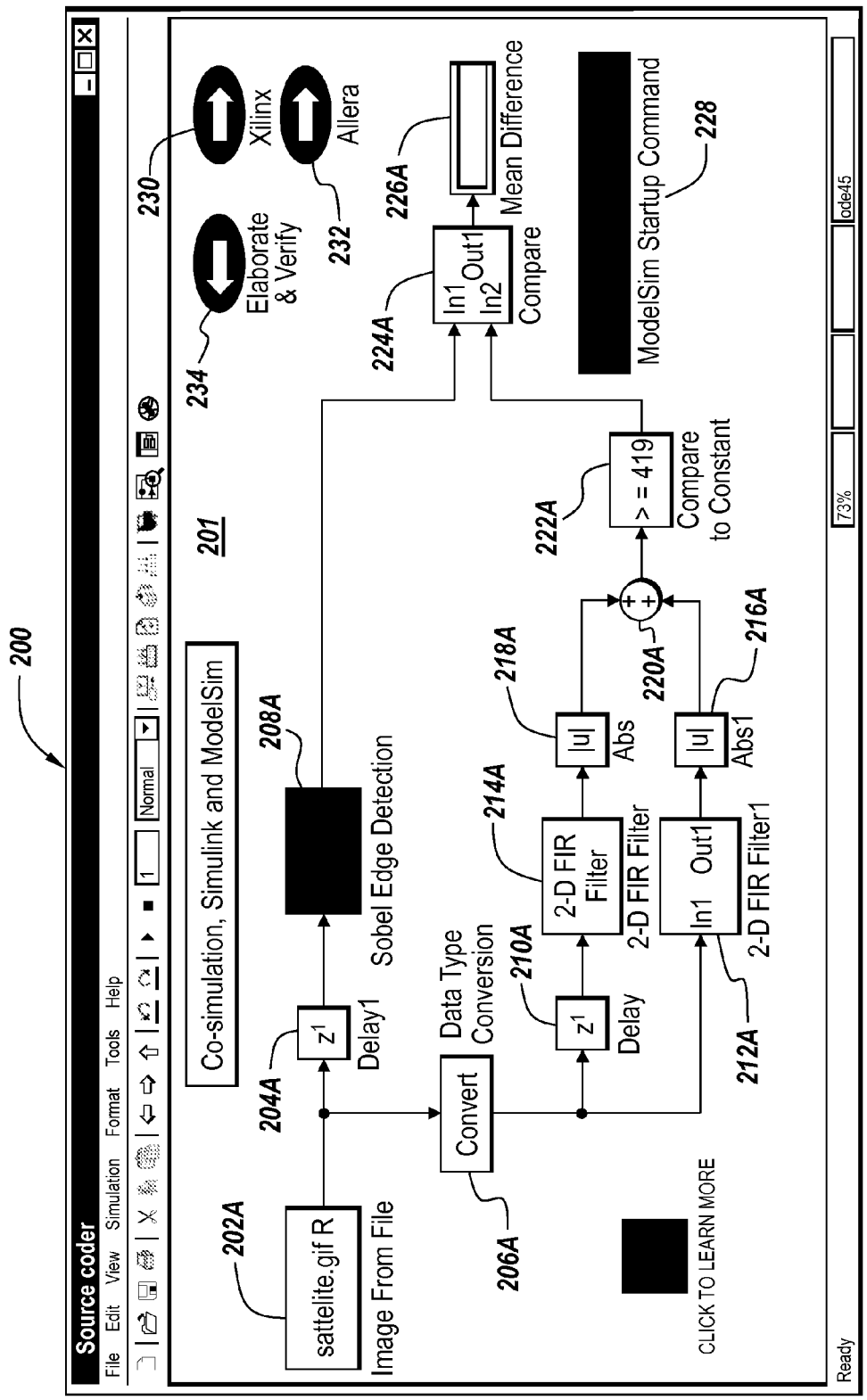
FIG. 2A is another example of a model in a graphical modeling environment.

FIG. 2A depicts a window 200 of a graphical modeling environment displaying a model representation 201 of a fixed-point edge detection circuit. In this example the model is a time-based model rendered using Simulink® model software. The SIMULINK environment is one example of a time-based graphical modeling environment that can be used to implement exemplary embodiments. Simulink® software is available from The MathWorks, Inc., of Natick, Mass. Exemplary embodiments of the invention can be implemented in other types of modeling environments, such as state based modeling environments, event based modeling environments, etc.

Model 201 includes an input 202A which is provided to Delay1 204A and Data Type Converter 206A. The output of the Delay 204A is provided to a Sobel Edge Detector 208A. The output of the Data Type Converter 206A is provided Delay 210A and 2-D FIR Filter1 212A. The output of Delay 210A is provided to 2-D FIR Filter 214A. The outputs of 2-D Fir Filter1 212A and 2-D FIR Filter 214A are passed to ABS1 216A and ABS 218A respectively. The outputs of ABS1 216A and ABS 218A are summed 220A and passed to a Comparator 222A. The outputs of the Comparator 222A and the Sobel Edge Detector 208A are then compared at Comparator 224A to determine a Mean Difference 226A. In the implementation of FIG. 2A, model 201 may be executed in conjunction with ModelSim (from Mentor Graphics) via Model Startup Command button 228.

As stated above, the model 201 of FIG. 2A represents but one implementation of the system, namely the Simulink® and ModelSim implementations of the system. Accordingly, the model 201 may be provided with graphical links 230, 232, and 234 to other implementations of the system. Button 230 provides a graphical link to a Xilinx implementation of the edge detection circuit. Button 232 provides a graphical link to the Altera implementation of the edge detection circuit. Button 234 provides a graphical link to generic model of the edge detection circuit that does not focus on a specific aspect. By activating a specific button, the corresponding model is opened for viewing and editing.

Figure 2B:
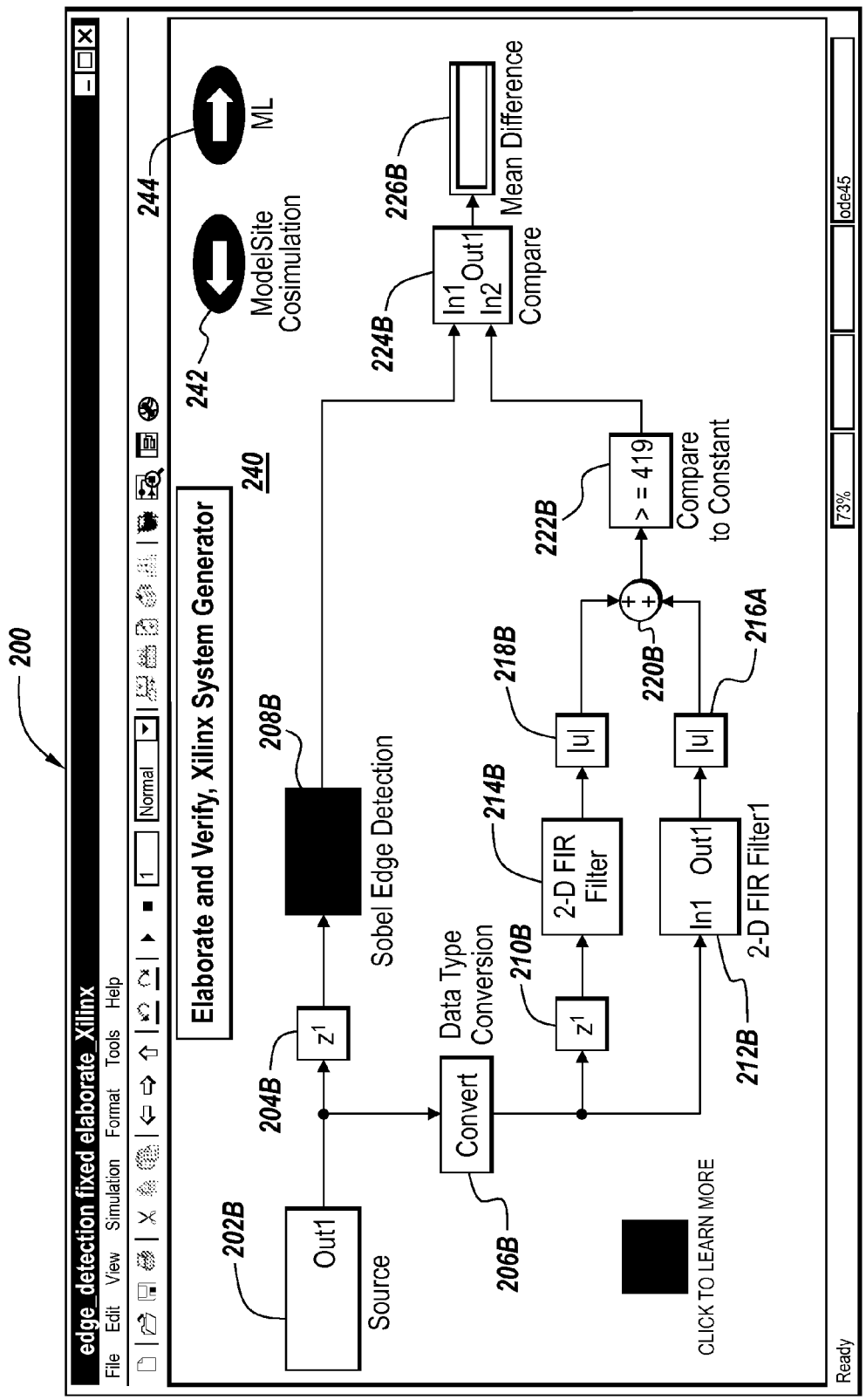
FIG. 2B an example of a model that is graphically linked to the model of FIG. 2A.

FIG. 2B depicts window 200 of the graphical modeling environment populated with a graphical model representation 240 of a Xilinx implementation of an edge detection circuit. The embodiment of FIG. 2B may be opened in window 200 when button 230 of FIG. 2A is activated on behalf of the user. Like the model 201 of FIG. 2A, model 240 includes an input 202B which is provided to Delay1 204B and Data Type Converter 206B. The output of the Delay 204B is provided to a Sobel Edge Detector 208B. The output of the Data Type Converter 206B is provided Delay 210B and 2-D FIR Filter1 212B. The output of Delay 210B is proved to 2-D FIR Filter 214B. The outputs of 2-D FIR Filter1 212B and 2-D FIR Filter 214B are passed to ABS1 216B and ABS 218B respectively. The outputs of ABS1 216B and ABS 218B are summed 220B and passed to a Thresholder 222B. The outputs of the Thresholder 222B and the Sobel Edge Detector 208B are then compared at Comparator 224B to determine a Mean Difference 226B. In the embodiment of FIG. 2B, the components may be configured to run on a Xilinx-based system. Model 240 may include graphical links 242, 244 to other aspects of the system. For Example, Button 242 may provide a graphical link to the Simulink model 200 of FIG. 2A.

Figure 2C:
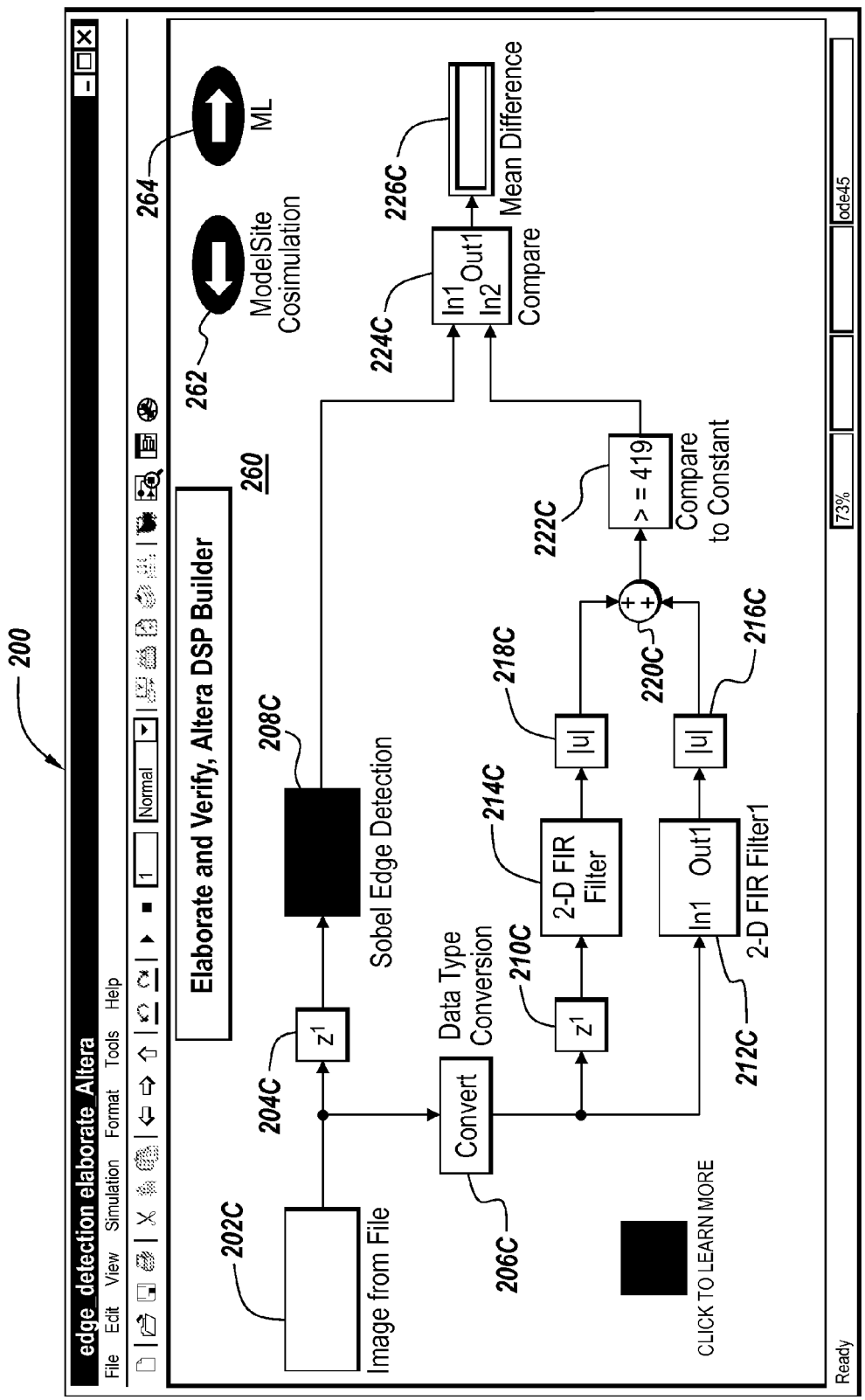
FIG. 2C an example of another model that is graphically linked to the model of FIG. 2A.

FIG. 2C illustrates window 200 populated with a graphical model representation 250 of an Altera implementation of an edge detection circuit. The embodiment of of FIG. 2C may open in window 200 when button 232A of FIG. 2A is activated. Like the models 201 and 240 of FIGS. 2A and 2B, model 250 includes an input 202C which is provided to Delay1 204C and Data Type Converter 206C. The output of the Delay 204C is provided to a Sobel Edge Detector 208C. The output of the Data Type Converter 206C is provided to Delay 210C and 2-D Fir Filter1 212C. The output of Delay 210C is provided to 2-D FIR Filter 214C. The outputs of 2-D Fir Filter1 212C and 2-D FIR Filter 214C are passed to ABS1 216C and ABS 218C respectively. The outputs of ABS1 216C and ABS 218C are summed 220C and passed to a Thresholder 222C. The outputs of the Thresholder 222C and the Sobel Edge Detector 208C are then compared at Comparator 224C to determine a Mean Difference 226C. In the embodiment of FIG. 2C, the components are configured to run on an Altera system. Model 250 may also include graphical links 252, 254 to other aspects of the system. For Example, Button 252 provide a graphical link to the Simulink® model 200 of FIG. 2A.

Figure 2D:
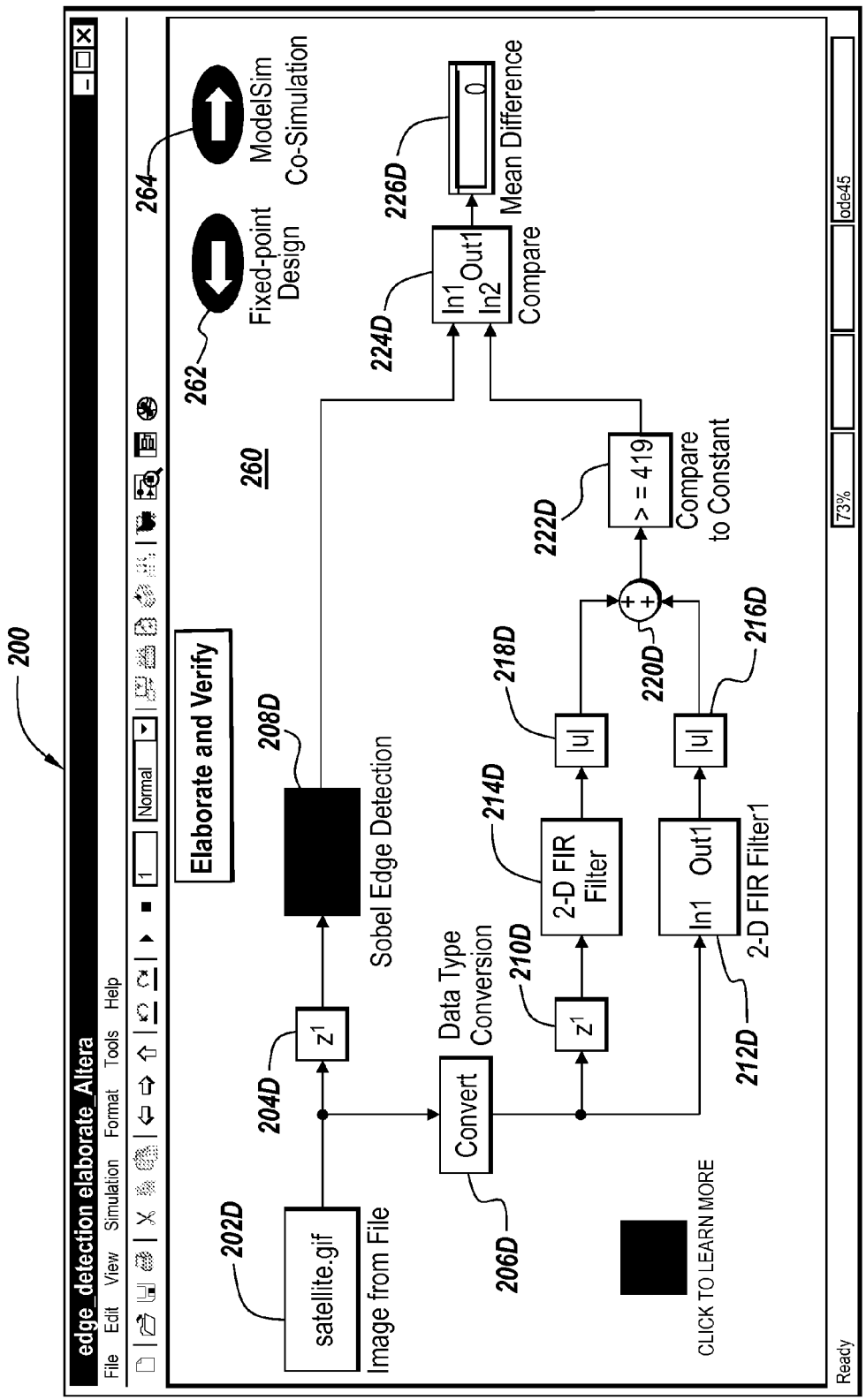
FIG. 2D an example of another model that is graphically linked to the model of FIG. 2A.

FIG. 2D illustrates window 200 populated with a graphical model representation 260 of a generic implementation of an edge detection circuit that does not represent a particular vender based implementation, such as Xilinx, Altera, Texas Instruments, and Infineon. The embodiment of FIG. 2D may be opened in window 200 when button 234A of FIG. 2A is activated. Like the models 200, 240, and 250 of FIGS. 2A, 2B and 2C, model 250 includes an input 202D which is provided to Delay1 204D and Data Type Converter 206D. The output of the Delay 204D is provided to a Sobel Edge Detector 208D. The output of the Data Type Converter 206D is provided to Delay 210D and 2-D FIR Filter1 212D. The output of Delay 210D is provided to 2-D FIR Filter 214D. The outputs of 2-D Fir Filter1 212D and 2-D FIR Filter 214D are passed to ABS1 216D and ABS 218D respectively. The outputs of ABS1 216D and ABS 218D are summed 220D and passed to a Thresholder 222D. The outputs of the Thresholder 222D and the Sobel Edge Detector 208D are then compared at Comparator 224D to determine a Mean Difference 226D. Model 260 may also include graphical links 262, 264 to other models of the system directed to specific aspects. For Example, Button 264 provide a graphical link to the Simulink® model 200 of FIG. 2A.

In some embodiments, a graphical link may also indicate the type of model to which the graphical link is associated. In the examples of FIGS. 1 and 2, the graphical links are provided with labels that provide the name of the linked file. In other embodiments, the graphical link may have a different appearance based on the type of model it is linked to. In still other embodiments, a pop-up may appear when cursor hovers over the link. The pop-up can provide additional information about the model being linked to. Examples of such additional information, includes but is not limited to, model type, file size, number of blocks, cyclomatic complexity, location, or a thumbnail representation.

In certain embodiments, the availability of the graphical link may be conditional. That is the provided graphical link may unavailable for activation. For example, the model linked to may not be available. In another example, the model providing the link must compile without warnings or errors before its graphical link may be activated. The availability of the graphical link may be indicated by the appearance of the link or the additional information displayed as a pop-up, as discussed above.

While the previous examples have focused on graphical models in a Simulink® graphical modeling environment, it should be understood that the models are not limited to such embodiments. For example, the models may be MATLAB® models with Simulink®, Stateflow®, SimMechanic SimDriveline, SimEvents™, or SimBiology™ models as well as any combination thereof. Exemplary embodiments may further operate with models that are not graphical models. For example, an associated text-based model, such as an M-File, C++ model, etc., may be graphically linked using techniques used herein. As such, a graphical model may be graphically linked to a text-based model, another graphical model, or still another type of model.

Further examples of graphical modeling environments that may be used to develop and/or execute a graphical model in accordance with exemplary embodiments include, but are not limited to, LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB Extend from Imagine That, Inc. Scicos from The French National Institution for Research in Computer Science and Control (INRIA), MSC.Adams® from MSC.Software Corporation, Rhapsody® from iLogix, Inc., Rational® from International Business Machines Corporation, ARTiSAN Studio from ARTiSAN Software Tools, Inc. SCADE™ from Esterel Technologies, Inc., among others. Exemplary embodiments can also be used in a text based environment, such as Mathematica® from Wolfram Research, Inc., Maple™ from Maplesoft, Scilab™ from The French National Institution for Research in Computer Science and Control (INRIA), MATLAB from The MathWorks, Inc., among others.

In certain embodiments a graphical link may link to multiple models such that when activated multiple models are displayed. For example, activating a link could cause an alternate graphical model as well as a text-based model to open. In such embodiment, the additional models linked to may be indicated by the appearance of the link or the additional information displayed as a pop-up, as discussed above.

In some embodiments, other files, besides model files, may be graphically linked (e.g., to open a script file, text document, spreadsheet, etc). Additional files may also be opened in conjunction with model files. For example activating a link may open a model file as well as non-model file. In such a manner a "call back" can be associated with a link such that when the link is activated, an M script is also executed. The additional files linked to may be indicated by the appearance of the link or the additional information displayed as a pop-up, as discussed above.

Figure 3A:
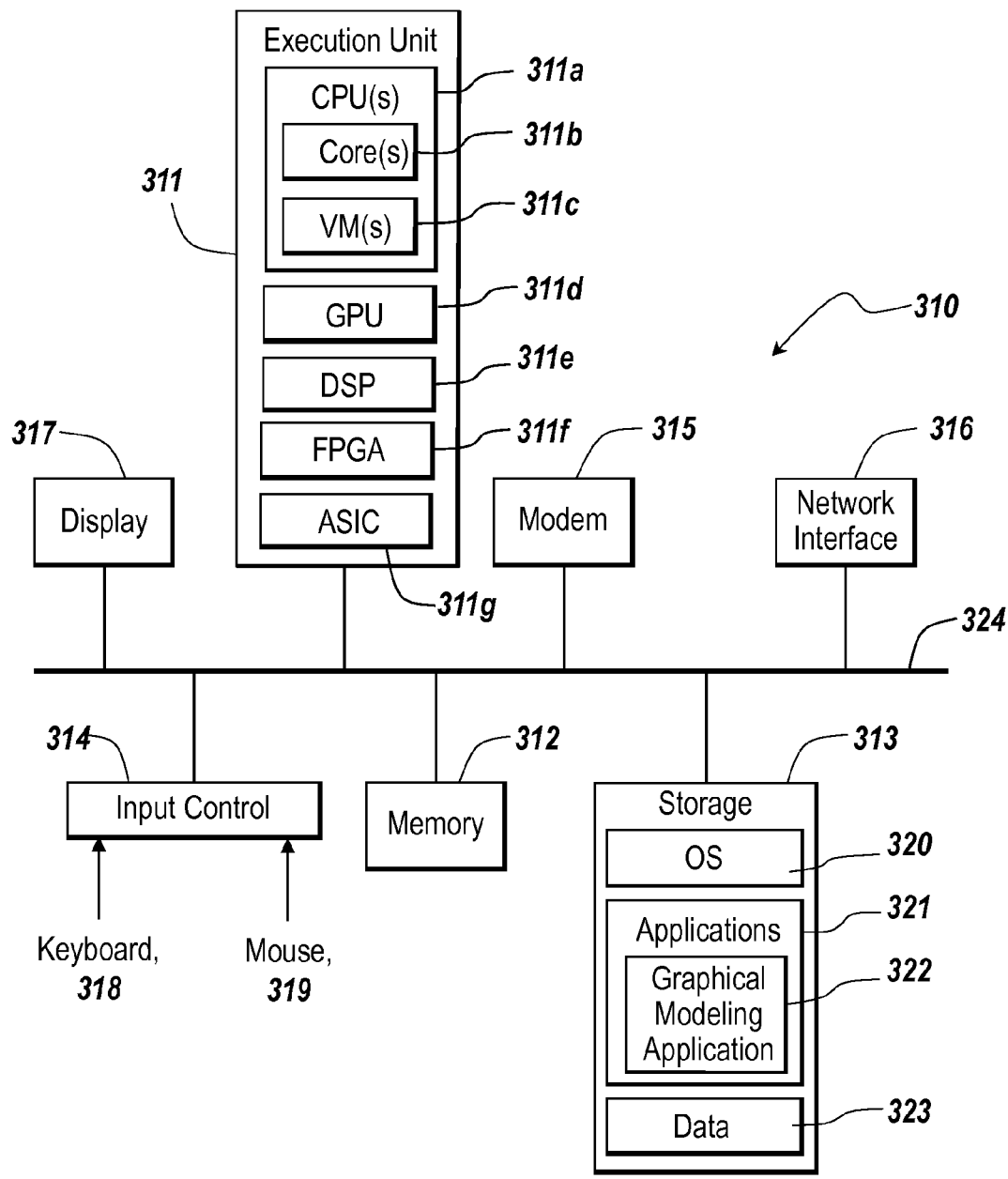
FIG. 3A illustrates an environment suitable for practicing exemplary embodiments.

FIG. 3A is an exemplary computing device 310 suitable for practicing an exemplary embodiment. One of ordinary skill in the art will appreciate that the computing device 310 is intended to be illustrative and not limiting of the present invention. The computing device 310 may take many forms, including but not limited to a workstation, server, network computer, quantum computer, optical computer, bio computer, Internet appliance, mobile device, pager, tablet computer, etc.

Computing device 310 may include an execution unit 311, a memory 312, a storage device 313, an input control 314, a modem 315, a network interface 316, and a display 317. The execution unit 311 may control components of the computing device 310 to provide a graphical modeling environment. The memory 312 may store instructions or data and may provide them to the execution unit 311 so that the execution unit 311 can operate the computing device 310 and can run the graphical modeling environment. The storage 313 may contain software tools for applications.

In one implementation, storage 313 can include code for the operating system (OS) 320 of the device 310, code for applications 321 running on the operation system 320 including applications 322 for providing the graphical modeling environment, and data 323 for the graphical models generated in the graphical modeling environment. In other implementations, the applications can be stored in the memory 312 or they can be stored on a network device, such as a networked storage device.

Optionally, the computing device 310 may include single or multiple Central Processing Units (CPUs) 311a for executing software loaded in the memory 312, and other programs for controlling system hardware. Each of the CPUs 311a can include a single core or multiple cores 311b. The code loaded in the memory 312 may run in a virtualized environment, such as in a Virtual Machine (VM) 311c. Multiple VMs 311c may be resident on a single processor. Also, part of the application could be run in hardware, for example, a graphics processing unit (GPU) 311d, digital signal processor (DSP) 311e, a field programmable gate array (FPGA) 311f or an application specific integrated circuit (ASIC) 311g.

The input control 314 may interface with a keyboard 318, a mouse 319, and/or other input devices, such as neuro interfaces. The computing device 310 may receive through the input control 14 input data necessary for creating models, such as the selection of the attributes and operations of components in the models. For example, the user may input parameters of components via, for example, dialog boxes of the components in the models. The computing device 310 may also receive through the input control 314 input data necessary for controlling the execution of the models. Display 317 may present user interfaces to allow users to create, edit, simulate, execute, etc., the models. The resources depicted in FIG. 3 may be connected to each other through the bus 324. The bus 324 may be an on-chip, off-chip or network bus and/or may include a control-area network bus. The bus 324 may also include various other implementations, such as Peripheral Component Interconnect (PCI) and PCMCI.

Figure 3B:
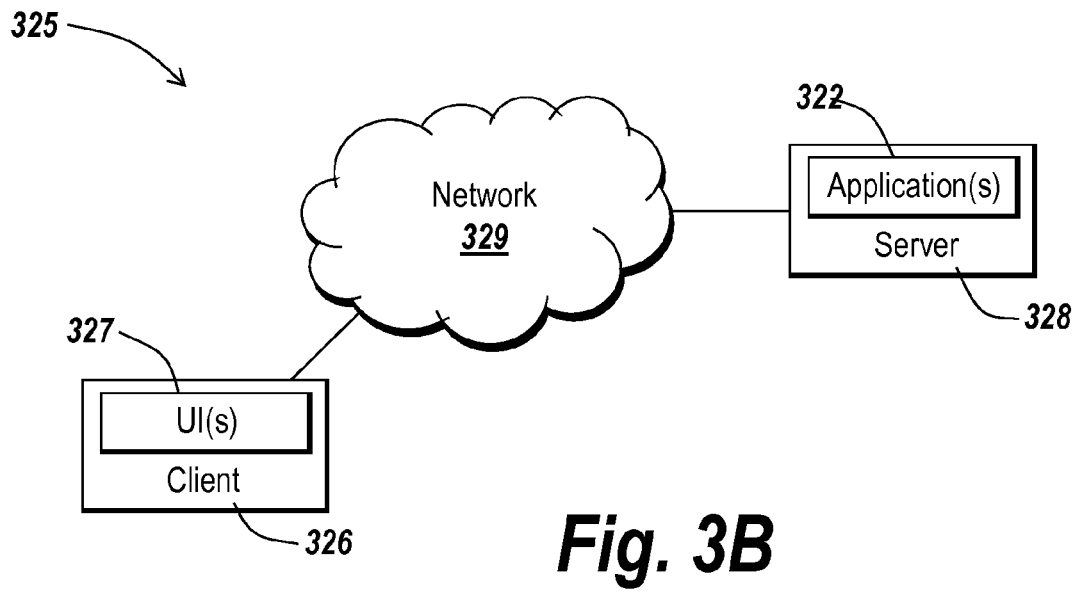
FIG. 3B illustrates an exemplary client-server environment suitable for practicing an exemplary embodiment.

FIG. 3B depicts an exemplary network environment 325 suitable for implementing a distributed embodiment. The client 326 and server 328 may be coupled to the network 329 through one or more communication links. The network interface 316 and the modem 315 (shown in FIG. 3A) of the computing device 310 enable the client 326 to communicate with the server 328 through the communication network 329.

The communication network 329 may include a control-area network, Internet, intranet, Local Area Network (LAN), Wide Area Network (WAN), Metropolitan Area Network (MAN), Wireless, Optical, etc. Communication facilities can support the distributed implementations of exemplary embodiments. The network interface may employ a variety of connections including, but not limited to, standard telephone lines, LAN or WAN links (e.g., T1, T3, 56 kb, X.25), broadband connections (e.g., Integrated Services Digital Network (ISDN), Frame Relay, Asynchronous Transfer Mode (ATM)), cluster interconnection (Myrinet), Peripheral Component Interconnect (PCI), PCI Extended (PCI-X)), wireless connections (e.g., IEEE 802.11, IEEE 802.16), or some combination of any or all of the above.

In an exemplary embodiment, the client 326 may include user interfaces 327 for a user to create, edit, simulate, or execute a model on the client 326. The server 328 may include applications 322 for a graphical modeling environment that enables a user to create a graphical model. The server 328 may provide the applications 322 to the client 326 according to certain conditions, such as a license agreement. The client 326 may use the applications 322 provided from the server 328 and may create a graphical model. The client 326 may execute the graphical model or may send the graphical model to the server 328 for execution. The server 328 may then return the execution results to the client 326 so that the user can determine the behavior of the graphical model. In certain embodiments a storage device 330 may also be provided on the network 329. Alternative implementations of the network environment 325 may include network devices, such as routers, switches, firewalls, intrusion detection systems, gateways, etc. In one embodiment, one or more network devices may provide models, graphical links, data management services, etc., to other devices on network 329, such as client 326 and/or server 328.

An exemplary embodiment may be practiced with different types of graphical modeling environments, such as a signal-based modeling and simulation environment, a time-based block diagram modeling and simulation environment, a state-based and flow diagram modeling and simulation environment, a discrete-event system modeling and simulation environment, and a dataflow modeling and simulation environment. An exemplary embodiment may also be practiced with Unified Modeling Language (UML) modeling and simulation environments. Another exemplary embodiment may extend to a text-based programming environment, such as the MATLAB® environment.

Figure 4:
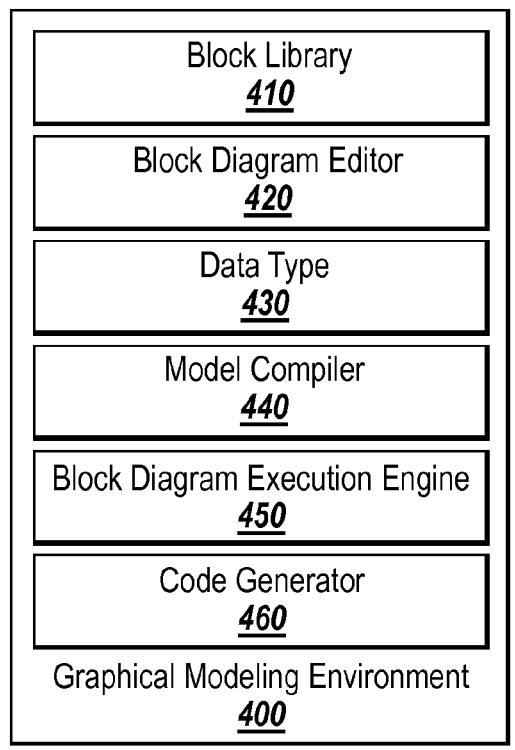
FIG. 4 illustrates an exemplary graphical modeling environment suitable for practicing an exemplary embodiment.

FIG. 4 depicts an example of the graphical modeling environment 400 (hereinafter environment 400). Environment 400 may enable users to design a graphical model for a system, simulate the system's behavior, analyze the performance of the system, and refine the design of the system. In the environment 400, users may build a graphical model, such as a block diagram model, using blocks provided in a block library 410. The users may be able to customize this block library 410 to reorganize blocks in a user-defined format, to delete undesired blocks, and/or to add custom blocks users have designed. The blocks may be moved via a human-machine interface, such as the mouse 319 or keyboard 318, from the block library 410 onto a window (e.g., model canvas included in an area of a display device, windows 100, 200, etc.).

The environment 400 may include a block diagram editor 420 that allows users to perform actions/operations such as drawing, editing, annotating, saving, printing, etc., with respect to block diagram representations of systems. The block diagram editor 420 is a graphical user interface (GUI) component that allows model related information to be displayed to a user. In the graphical modeling environment 400, there may be a textual interface (e.g., a text editor window) with a set of commands that allow interaction with the block diagram editor 420. Using this textual interface, users may write scripts that perform automatic editing operations on the graphical model.

Once a graphical model has been constructed within the environment 400, the model may be executed in the environment 400. The environment 400 may include a model compiler 434 that compiles and/or links the graphical model to produce an "in-memory executable" version of the model. The in-memory executable version of the model may be used for generating code and/or simulating a graphical model. The compile stage may involve preparing data structures and/or evaluating parameters, configuring and/or propagating block characteristics, determining block connectivity, performing block reduction and/or block insertion, etc.

The environment 400 may also include a block diagram execution engine 450 for executing the "in-memory executable" version of a graphical model or the generated code for the model. In executing a graphical model, the block diagram execution engine 450 evaluates the state and output of the components in the model. Code may or may not be generated from the model by the code generator 460 using exemplary embodiments. When code is generated, the model may be simulated/executed through an accelerated simulation mode in which the graphical model, or portions thereof, are translated into software modules or hardware descriptions (broadly termed "code").

When code is not generated, the graphical model may execute in an interpretive mode in which the compiled and linked version of the graphical model may be directly utilized to execute the model over a desired time-span (e.g. a time interval). This interpretive mode of execution is suitable for getting fine-grained signal traceability. That is in interpretive mode a user can have detailed control over all the computational steps in evaluating a model. A user may track every computation that is performed, the evaluations of decision points, and the communication of values between elements of the computational representation of a model. In other implementations, when users generate code, they may choose to not proceed further with the graphical model's execution. They may choose to take the code and deploy it outside of the confines of the modeling software environment.

Figure 5:
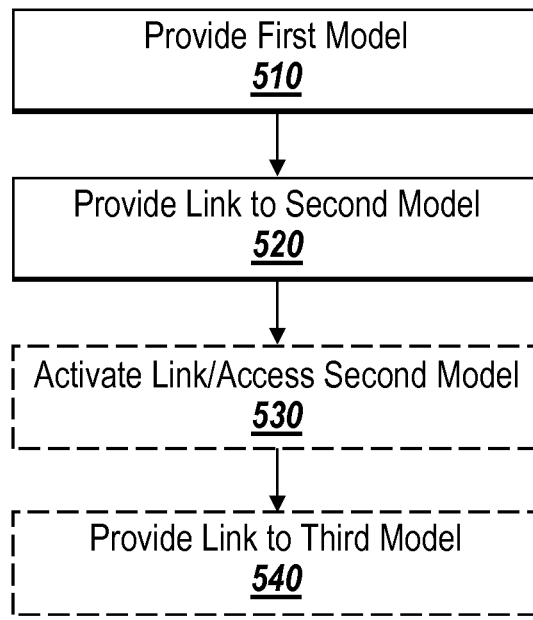
FIG. 5 is a flow chart illustrating the processing that may performed in an exemplary embodiment to provide navigation between models.

FIG. 5 depicts a flowchart 500 of exemplary processing that may be performed in one exemplary embodiment. A first model representing a system may be provided (step 510). A link (to a second model, which is independent from the first model), may be provided as part of the first model (step 520). In some embodiments, the second model may then be accessed by activating the graphical link (optional step 530). These steps will be discussed in further detail herein below.

In certain embodiments, several models may be graphically linked. For example, a graphical link to a third model, which is not part of the first or second models, may be provided as part of the first and/or second models (optional step 540). This graphical link may then be used to access the third model from first and/or second models. It should be understood that any number of models can be associated in such a manner. Other embodiments and configurations will be apparent to one skilled in the art given the benefit of this disclosure.

Figure 6:
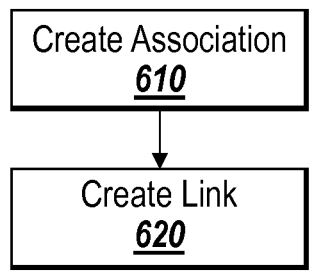
FIG. 6 is a flow chart illustrating exemplary processing that can be performed in connection with the processing of FIG. 5 in an exemplary embodiment to provide navigation between models.

FIG. 6 depicts additional processing 600 that may be performed as part of step 520 of FIG. 5. In FIG. 6, step 520 (FIG. 5) further includes the steps of creating an association between the first and second models (step 610) and creating a graphical link based on the association between the first and second models (step 620).

Figure 7A:
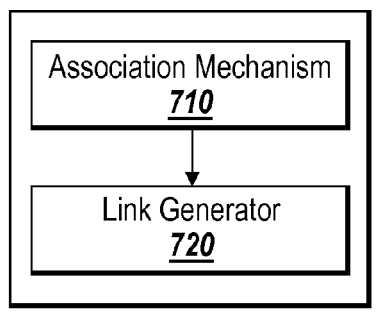
FIG. 7A is a block diagram illustrating an exemplary linking mechanism for creating links between models.

In another embodiment a linking mechanism or tool may be used to create graphical links between two or more models. An example of this can be seen in FIG. 7A. In FIG. 7A, the linking mechanism 700 includes an association mechanism 710 and a link generator 720. The linking mechanism may be implemented in hardware, software, or a combination of both.

The association mechanism 710 operates to create an association between at least a first and a second model which is not part of the first model. One implementation of the association mechanism is a Graphical User Interface (GUI).

Figure 7B:
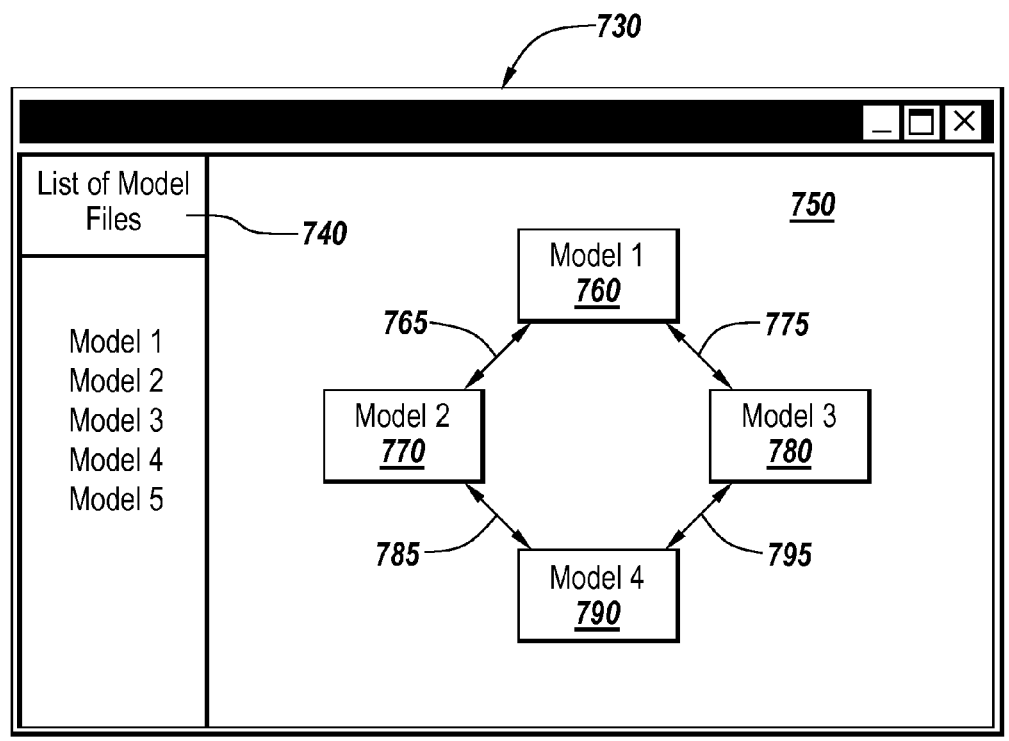
FIG. 7B illustrates and exemplary graphical user interface for creating associations between models.

FIG. 7B depicts one embodiment of a Graphical User Interface (GUI) 730 that may be used to create an association between two or more models. The GUI 730 in this example allows a user to visually create associations between models. In this embodiment the GUI includes a List of Model Files 740 and a visual programming workspace 750.

GUI 730, may include a listing of model files 740 along the left side of the GUI 730. The listing includes the model files the user will work with in the visual programming workspace 750. A user may add or subtract models from this list using traditional file means, such as by using pull down menus, right click menus, keyboard commands, etc. The model files can include files that contain code for models associated with the graphical modeling environment. Each model file may include the code for the graphical representation as well as the operation of a model, including the subsystems of the model.

Next to the List of Model files 740 is a visual programming workspace 750. Workspace 750 allows a user to create associations and graphical links between the various models. In one embodiment, model blocks 760 770, 780, and 790 representing Model 1, Model 2, Model 3, and Model 4 respectively are placed in the workspace 750 using conventional techniques, such as drag and drop techniques. Associations may be created between model blocks 760, 770, 780, and 790 using arrows 765, 775, 785 and 795. Thus Model 2 770 and Model 3 780 are associated with Model 1 760 via arrows 765 and 775. Model 4 790 is associated with Model 2 770 and Model 3 780 via arrow 785 and 795.

Still referring to FIG. 7B, the graphical links to models are created based on the associations created by the connecting arrows 765, 775, 785, and 795. In certain embodiments, the user may specify the nature of the association by the type of arrow used to connect models blocks. In the example of FIG. 7B, the directionality of the arrow specifies the direction of the graphical link to be created. That is, the one-directional arrows 765 and 785 indicated the graphical link is one way while bi-directional arrows 775 and 795 indicate the graphical link in both directions. In other words, Model 1 760 will have a graphical link to Model 2 770 as specified by one-directional arrow 765. Model 2 770 will have a graphical link to Model 4 790 as specified by one-directional arrow 785. Similarly, Model 1 760 will have a graphical link to Model 3 780 and Model 3 780 will have a graphical link to Model 1 760 as specified bi-directional arrow 775. Model 3 780 will have a graphical link to model 4 790 and Model 4 790 will have a graphical link to Model 3 780 as specified by bi-directional arrow 795. Using the specified associations the appropriate graphical links can be created and provided in the appropriate models.

One technique for creating graphical links may use the link generator 720 of FIG. 7A. The link generator 720 operates to create a graphical link, based on the association of the first and second model, such as created by the association mechanism 710. One implementation of the model linking mechanism is a code generator for generating code that provides a graphical link from the first model to the second model. For example, the link generator may take the file names of the models as well as the file paths indicating the locations of the models and generate code for graphical links, such as hypertext links, to associated models.

In some embodiments, the links may be included as part of a link map that defines the associations and links between models. The link map may be generated by the linking mechanism based on the created associations and/or generated links. For example, the link map could be an XML document that specifies which models have which links, as well as the linking information associated with such link. In certain embodiments, a user may edit this link map to create, remove, or edit associations and links. Likewise a user may create a link map which may then be processed by the modeling environment, or in some instances a model linking mechanism as shown in FIG. 7A, to automatically add the links based on the link map.

In certain embodiments, the link map may be derived from a version control system such as, for example, CVS. Relations between different versions such as one model being the next version of a second model and one model being the previous version of a model can be inferred by the modeling environment and links inserted in the models accordingly. Multiple models may be next revisions of one other model, introducing branching in the dependencies. Hierarchy can be introduced in the links by tracing back multiple previous versions of a model and multiple next versions of a model. Upon link activation, models can be automatically checked out of the version control system and checked into the version control system.

In certain embodiments the linking mechanism of FIG. 7A, including the association mechanism GUI 700 of FIG. 7B, is provided as part of the graphical modeling environment. In other embodiments, the linking mechanism may be a separate tool, such as a toolkit or API, plug-in, etc., that can be used in conjunction with the graphical modeling environment. It should be also understood that the methodology for creating associations between models is not limited the graphical programming interface set forth above. In certain embodiments the associations may be created using menus, text commands, etc. In another embodiment, graphical links may be provided as configurable block objects that can be placed into a model and configured to link to another model. Likewise, the graphical links may be movable by a user within a displayed model. Other possible implementations and configurations will be apparent to one skilled in the art given the benefit of this disclosure.

In one embodiment, once the association is created using a tool such as the mechanism 700 of FIG. 7A or using a menu or text, the linking mechanism will automatically create the graphical links in the models such as link 534A or 530A in FIG. 500. Alternately, associations, such as associations indicated by arrows 765, 775, 785, and 795 in the GUI 730 may be automatically created based on the links that the user has manually created in the models by placing configurable block object into the model.

The examples to this point have focused primarily on the system where the graphical modeling environment was on a local computational device. The graphical modeling environment may of course also be implemented in a network environment as illustrated in FIG. 3B. As described above, the network environment 325 includes a server 328 and a client device 326 in communication over the network 329. Other devices, such as a storage device 330, may also be connected to the network.

In one such embodiment a system for generating and displaying a graphical modeling application, includes a distribution server for providing to a client device, a first model having a graphical link to a second model; and, a client device in communication with the distribution server. Here the distribution server provides a client device, such as a computing device discussed above, with a first model. The first model includes, as part of the model, a graphical link to a second model. The client may then view the first model and access the second model using the graphical link of the first model. The second model may be local on the client or on the distribution server.

Figure 8:
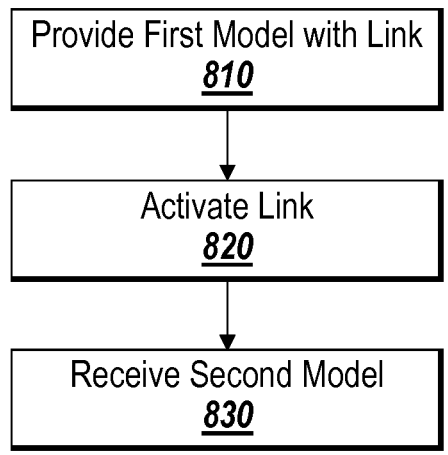
FIG. 8 is a flow chart illustrating processing performed in a network based implementation.

In another embodiment, exemplary processing 800 as depicted in FIG. 8 is provided for use in the network of FIG. 3B. The processing of FIG. 8 may include providing, at the client 326, a first model representing a system (Step 810); providing, as part of the first model, a graphical link to second model at the server 328 (Step 820); and receiving, at the client 326 from the server 328, the second model in response to the activation of the graphical link (step 830). In certain embodiments, the second model may be stored at and sent and received from the storage device 330.

It will be understood by one skilled in the art that these network embodiments are exemplary and that the functionality may be divided up in any number of ways over a network.

Exemplary implementations may allow for linking one graphical model to another graphical model using a user interface, such as a graphical user interface.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 5, 6, and 8, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 3A, 3B, 4 and 7A depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method comprising:
receiving information associated with a first model,
the first model representing a first part of a system, and
the receiving being performed by a computing device;
receiving information associated with a second model,
the second model representing a second part of the system, and
the receiving the information associated with the second model being performed by the computing device;
generating a graphical link to the second model,
the generating being performed by the computing device;
associating the graphical link with the first model,
the associating being performed by the computing device;
providing, for presentation based on associating the graphical link with the first model and without providing the second model, the first model and the graphical link,
the graphical link being located within the first model, and
the providing for presentation being performed by the computing device;
receiving an activation of the graphical link,
the receiving the activation being performed by the computing device; and
providing, for presentation, the second model,
the second model being provided for presentation based on receiving the activation of the graphical link, and
the providing for presentation the second model being performed by the computing device.

2. The method of claim 1, where the first model is functionally independent from the second model.

3. The method of claim 1, where, when providing for presentation the second model, the method includes:
providing, for presentation, the second model while providing, for presentation, the first model.

4. The method of claim 3, where
the first model is provided, for presentation, in a first window, and
the second model is provided, for presentation, in a second window.

5. The method of claim 1, where, when providing for presentation the second model, the method includes:
providing, for presentation, the second model without providing, for presentation, the first model.

6. The method of claim 1, where
when providing for presentation the second model, the method includes:
providing, for presentation, the second model and a graphical link to the first model, and
the method further includes:
receiving an activation of the graphical link to the first model; and
providing, for presentation and based on receiving the activation of the graphical link to the first model, the first model.

7. The method of claim 1, further comprising:
providing, for presentation, a graphical link to a third model,
the third model being different than the first model and being different than the second model; and
providing, for presentation and based on receiving the activation of the graphical link to the third model, the third model.

8. A non-transitory computer-readable medium storing instructions, the instructions comprising:
one or more instructions which, when executed by a processor, cause the processor to:
receive information associated with a first model;
receive information associated with a second model;
generate a graphical link to the second model;
associate the graphical link with the first model;
provide, for presentation based on associating the graphical link with the first model and without providing the second model, the first model and the graphical link,
the graphical link being located within the first model;
receive an activation of the graphical link; and
provide, for presentation, the second model,
the second model being provided for presentation based on receiving the activation of the graphical link.

9. The non-transitory computer-readable medium of claim 8, where the first model is functionally independent from the second model.

10. The non-transitory computer-readable medium of claim 8, where the one or more instructions to provide for presentation the second model, include:
one or more instructions to provide, for presentation, the second model while providing, for presentation, the first model.

11. The non-transitory computer-readable medium of claim 10, where
the first model is provided, for presentation, in a first window, and
the second model is provided, for presentation, in a second window.

12. The non-transitory computer-readable medium of claim 8, where the one or more instructions to provide for presentation the second model, include:
one or more instructions to provide, for presentation, the second model without providing, for presentation, the first model.

13. The non-transitory computer-readable medium of claim 8, where
one or more instructions to provide for presentation the second model include:
one or more instructions to provide, for presentation, the second model and a graphical link to the first model, and
the instructions further include:
one or more instructions to receive an activation of the graphical link to the first model; and
one or more instructions to provide, for presentation and based on receiving the activation of the graphical link to the first model, the first model.

14. The non-transitory computer-readable medium of claim 8, where the instructions further include:
one or more instructions to provide, for presentation, a graphical link to a third model,
the third model being different than the first model and being different than the second model; and
one or more instructions to provide, for presentation and based on receiving the activation of the graphical link to the third model, the third model.

15. A device comprising:
a memory to store instructions; and
a processor to execute the instructions to:

receive information associated with a first model;
receive information associated with a second model;
generate a graphical link to the second model;
associate the graphical link with the first model;
provide, for presentation based on associating the graphical link with the first model and without providing the second model, the first model and the graphical link,
   the graphical link being located within the first model;
receive an activation of the graphical link; and
provide, for presentation and based on receiving the activation of the graphical link, the second model,
   the second model being provided for presentation based on receiving the activation of the graphical link.

16. The device of claim 15, where the first model is functionally independent from the second model.

17. The device of claim 15, where the processor, when providing for presentation the second model, is further to:
provide, for presentation, the second model while providing, for presentation, the first model,
   the first model being provided, for presentation, in a first window, and
   the second model being provided, for presentation, in a second window.

18. The device of claim 15, where the processor, when providing for presentation the second model, is further to:
provide, for presentation, the second model without providing, for presentation, the first model.

19. The device of claim 15, where
the processor, when providing for presentation the second model, is further to:
   provide, for presentation, the second model and a graphical link to the first model, and
the processor is further to:
   receive an activation of the graphical link to the first model; and
   provide, for presentation and based on receiving the activation of the graphical link to the first model, the first model.

20. The device of claim 15, where processor is further to:
provide, for presentation, a graphical link to a third model,
   the third model being different than the first model and being different than the second model; and
provide, for presentation and based on receiving the activation of the graphical link to the third model, the third model.

* * * * *